(12) United States Patent
Fukuyama

(10) Patent No.: US 11,552,540 B2
(45) Date of Patent: Jan. 10, 2023

(54) METHOD OF MANUFACTURING MAGNET EMBEDDED CORE

(71) Applicant: Kuroda Precision Industries Ltd., Kanagawa (JP)

(72) Inventor: Osamu Fukuyama, Kanagawa (JP)

(73) Assignee: KURODA PRECISION INDUSTRIES LTD., Kanagawa (JP)

( * ) Notice: Subject to any disclaimer, the term of this patent is extended or adjusted under 35 U.S.C. 154(b) by 960 days.

(21) Appl. No.: 16/074,136

(22) PCT Filed: Apr. 13, 2016

(86) PCT No.: PCT/JP2016/002009
§ 371 (c)(1),
(2) Date: Nov. 25, 2019

(87) PCT Pub. No.: WO2017/179086
PCT Pub. Date: Oct. 19, 2017

(65) Prior Publication Data
US 2020/0091785 A1    Mar. 19, 2020

(51) Int. Cl.
*H02K 1/28* (2006.01)
*B29C 45/80* (2006.01)
(Continued)

(52) U.S. Cl.
CPC ........... *H02K 15/125* (2013.01); *B29C 43/18* (2013.01); *B29C 45/03* (2013.01); *B29C 45/14467* (2013.01); *B29C 45/7653* (2013.01); *B29C 45/80* (2013.01); *F16H 25/20* (2013.01); *H02K 1/276* (2013.01); *H02K 1/28* (2013.01); *H02K 7/06* (2013.01); *H02K 11/20* (2016.01);
(Continued)

(58) Field of Classification Search
None
See application file for complete search history.

(56) References Cited

U.S. PATENT DOCUMENTS 3,488,410 A   1/1970  Downes
3,568,554 A   3/1971  Wiechee
(Continued)

FOREIGN PATENT DOCUMENTS

CN   101356711 A   1/2009
CN   102843000 A   12/2012
(Continued)

OTHER PUBLICATIONS

Machine Translation JP 2014138448 A (Year: 2014).*
(Continued)

*Primary Examiner* — Robert J Grun
(74) *Attorney, Agent, or Firm* — Dority & Manning, P.A.

(57) ABSTRACT

In a method of manufacturing a magnet embedded core (1), creation of unnecessary resin from the resin for fixedly securing the magnet is prevented. The method includes a resin charging step of charging resin material (33) in solid form into the magnet insertion hole; a melting step of melting the resin material (33) in the magnet insertion hole, and a pressurization step of pressurizing an interior of the magnet insertion hole (3). The melting step includes melting the resin material (33) at least partly by preheating and inserting the magnet (4) into the magnet insertion hole (3).

18 Claims, 8 Drawing Sheets

(51) Int. Cl.

| | |
|---|---|
| *H02K 15/12* | (2006.01) |
| *H02K 15/03* | (2006.01) |
| *B29C 43/18* | (2006.01) |
| *H02K 1/276* | (2022.01) |
| *H02K 11/20* | (2016.01) |
| *H02K 11/21* | (2016.01) |
| *H02K 11/30* | (2016.01) |
| *B29C 45/03* | (2006.01) |
| *B29C 45/14* | (2006.01) |
| *B29C 45/76* | (2006.01) |
| *F16H 25/20* | (2006.01) |
| *H02K 7/06* | (2006.01) |
| *B29K 101/10* | (2006.01) |
| *B29K 105/00* | (2006.01) |
| *B29L 31/00* | (2006.01) |

(52) U.S. Cl.
CPC ............ *H02K 11/21* (2016.01); *H02K 11/30* (2016.01); *H02K 15/03* (2013.01); *H02K 15/12* (2013.01); *B29C 2043/182* (2013.01); *B29C 2945/76006* (2013.01); *B29C 2945/76083* (2013.01); *B29C 2945/76568* (2013.01); *B29K 2101/10* (2013.01); *B29K 2105/251* (2013.01); *B29K 2995/0008* (2013.01); *B29L 2031/7498* (2013.01); *F16H 2025/2053* (2013.01)

(56) References Cited

U.S. PATENT DOCUMENTS

| | | | |
|---|---|---|---|
| 4,923,383 A | 5/1990 | Kurumaji | |
| 8,896,177 B2 | 11/2014 | Kim | |
| 8,991,035 B2 | 3/2015 | Sasaki et al. | |
| 2009/0085416 A1 | 4/2009 | Masuzawa et al. | |
| 2009/0189309 A1 | 7/2009 | Matsubayashi | |
| 2010/0083486 A1 | 4/2010 | Amano et al. | |
| 2013/0069747 A1 | 3/2013 | Honkura et al. | |
| 2014/0042856 A1 | 2/2014 | Miyashita et al. | |
| 2014/0124978 A1 | 5/2014 | Mabu | |
| 2014/0131919 A1 | 5/2014 | Mabu | |
| 2014/0196276 A1 | 7/2014 | Nagai et al. | |
| 2014/0327329 A1 | 11/2014 | Kitada | |
| 2015/0054196 A1 | 2/2015 | Ishimatsu et al. | |

FOREIGN PATENT DOCUMENTS

| | | |
|---|---|---|
| DE | 102011078419 | 6/2012 |
| DE | 102011119512 | 5/2013 |
| JP | 2001169485 | 6/2001 |
| JP | 2001352747 | 12/2001 |
| JP | 2002272033 | 9/2002 |
| JP | 2005185081 | 7/2005 |
| JP | 2006211748 A | 8/2006 |
| JP | 2006311782 | 11/2006 |
| JP | 2007110880 A | 4/2007 |
| JP | 2009100634 | 5/2009 |
| JP | 2009171785 | 7/2009 |
| JP | 2010213536 | 9/2010 |
| JP | 2012010595 | 1/2012 |
| JP | 2012223024 A | 11/2012 |
| JP | 2014007926 | 1/2014 |
| JP | 2014018074 | 1/2014 |
| JP | 2014079056 | 5/2014 |
| JP | 2014083811 A | 5/2014 |
| JP | 2014093917 | 5/2014 |
| JP | 2014138448 | 7/2014 |
| JP | 2014143919 | 8/2014 |
| JP | 2015039296 | 2/2015 |
| JP | 2015089169 | 5/2015 |

OTHER PUBLICATIONS

International Search Report for PCT/JP2016/002009 dated Jul. 7, 2016, 2 pages.
International Search Report for PCT/JP2016/004123 dated Nov. 24, 2016, 2 pages.
International Search Report for PCT/JP2016/082291 dated Jan. 18, 2017, 1 page.
International Search Report for PCT/JP2017/012034 dated Jun. 12, 2017, 2 pages.
Japanese Office Action for JP2017528861 dated Jan. 16, 2018, 4 pages.
Japanese Office Action for JP2017200993 dated Feb. 13, 2018, 4 pages.
International Search Report for PCT/JP2017/014700 dated Jun. 29, 2017.
European Search Report for EP16898547.1 dated Nov. 11, 2019, 12 pages.
European Search Report for EP16898548.9 dated Nov. 11, 2019, 17 pages.

* cited by examiner

METHOD OF MANUFACTURING MAGNET EMBEDDED CORE

CROSS REFERENCE TO RELATED APPLICATIONS

This application is the U.S. National Stage entry of International Application Number PCT/JP2016/002009 filed under the Patent Cooperation Treaty having a filing date of Apr. 13, 2016, which is incorporated herein by reference.

TECHNICAL FIELD

The present invention relates to a method of manufacturing a magnet embedded core having magnets embedded therein.

BACKGROUND ART

Conventionally, it is known to manufacture a magnet embedded core by inserting a magnet into each of a plurality of magnet insertion holes extending axially in a rotor core, charging resin material into the magnet insertion holes, and cure the charged resin material to fixedly secure the magnets in the rotor core. By fixedly securing the magnets in the respective magnet insertion holes with the resin, the magnets are prevented from breaking in use, and the rotor core is enabled to stably follow the rotating magnetic field created by the stator.

In conjunction with such a method of manufacturing a magnet embedded core, it is known, for example, to place a rotor core, along with an intermediate die, in a mold die assembly having an upper die and a lower die, the lower die being provided with a tubular pot and a plunger vertically moveable in the pot, and pressure-feed mold resin melted in the pot by moving the plunger upward such that the mold resin is charged into the magnet insertion holes of the rotor core via runners and gates formed between the intermediate die and the lower die, and thereafter is thermally cured. See Patent Document 1.

PRIOR ART DOCUMENT(S)

Patent Document(s)

Patent Document 1: JP2014-79056A

SUMMARY OF THE INVENTION

Task to be Accomplished by the Invention

According to the prior art such as that disclosed in Patent Document 1, when the mold die assembly is opened and the rotor core is removed after the resin molding, cured resin inevitably remains in resin passages in the intermediate die and other places, and this remaining resin (unnecessary resin) is eventually separated from the rotor core and discarded. Therefore, in view of minimizing the material cost of the resin material or from other points of view, it is desirable to prevent such unnecessary resin from being created.

The present invention was made in view of such a problem of the prior art, and has a primary object to provide a method of manufacturing a magnet embedded core that can prevent creation of such unnecessary resin from the resin material used for fixedly securing the magnets.

Means to Accomplish the Task

A first aspect of the present invention provides a method of manufacturing a magnet embedded core (1) including a magnet (4) embedded in resin filling a magnet insertion hole (3) extending axially in a motor core (2), the method comprising: a resin charging step of charging resin material (33) in solid form into the magnet insertion hole; a melting step of melting the resin material in the magnet insertion hole; and a pressurization step of pressurizing an interior of the magnet insertion hole, wherein the melting step includes melting the resin material at least partly by preheating and inserting the magnet into the magnet insertion hole.

In the method of manufacturing a magnet embedded core according to the first aspect of the present invention, because the resin material in solid form is charged into the magnet insertion hole, and the resin material in the magnet insertion hole is melted by inserting the preheated magnet into the magnet insertion hole, no resin passage is required for introducing resin melted in an outside part into the magnet insertion hole so that the unnecessary resin is prevented from being created from the resin used for fixedly securing the magnet.

According to a second aspect of the present invention, in conjunction with the first aspect, the resin material consists of thermosetting resin, and the method further comprises a thermally curing step of curing the resin material pressurized in the pressurization step by heating the motor core.

In the method of manufacturing a magnet embedded core according to the second aspect of the present invention, by using the thermosetting resin as the resin material, the heat resistance of the magnet embedded core (in particular, the resin that fixedly secures the magnet in the magnet insertion hole) can be ensured without any difficulty once the core is manufactured.

According to a third aspect of the present invention, in conjunction with the first or second aspect, the method further comprises a core preheating step of preheating the motor core prior to the resin charging step.

In the method of manufacturing a magnet embedded core according to the third aspect of the present invention, even when the heat required for melting the resin material is not adequately supplied by the magnet, the resin material in the magnet insertion hole can be melted in a reliable manner.

According to a fourth aspect of the present invention, in conjunction with any one of the first to third aspects, the melting step comprises melting the resin material by heating the motor core following at least the resin charging step.

In the method of manufacturing a magnet embedded core according to the fourth aspect of the present invention, even when the heat required for melting the resin material is not adequately supplied by the magnet, the resin material in the magnet insertion hole can be melted in a reliable manner.

According to a fifth aspect of the present invention, in conjunction with any one of the first to fourth aspects, the resin material is formed by molding granular raw material resin.

In the method of manufacturing a magnet embedded core according to the fifth aspect of the present invention, it is possible to prevent scattering of raw material resin in granular form (namely, having relatively small diameters) out of the magnet insertion hole during the resin charging step and the melting step, and to prevent voids from being created in the resin filling the magnet insertion hole.

According to a sixth aspect of the present invention, in conjunction with the fifth aspect, the resin material is provided with a contact surface (33a, 33b) capable of contacting at least one of surfaces (3a-3d) defining the magnet insertion hole.

In the method of manufacturing a magnet embedded core according to the sixth aspect of the present invention, the heat transfer from the motor core (in particular, the surfaces defining the magnet insertion hole) to the resin material is promoted so that the resin material in the magnet insertion hole can be melted quickly.

According to a seventh aspect of the present invention, in conjunction with any one of the first to fourth aspects, the resin material is in granular form.

In the method of manufacturing a magnet embedded core according to the seventh aspect of the present invention, the resin material can be easily charged into the magnet insertion hole without regard to the configuration of the magnet insertion hole or the required amount of the resin material.

Effects of the Invention

As discussed above, the method of manufacturing a magnet embedded core according to the present invention can prevent the creation of unnecessary resin from the resin used for fixedly securing the magnet.

BRIEF DESCRIPTION OF THE DRAWING(S)

EMBODIMENT(S) FOR CARRYING OUT THE INVENTION

A preferred embodiment of the present invention is described in the following with reference to the appended drawings.

Figure 1:
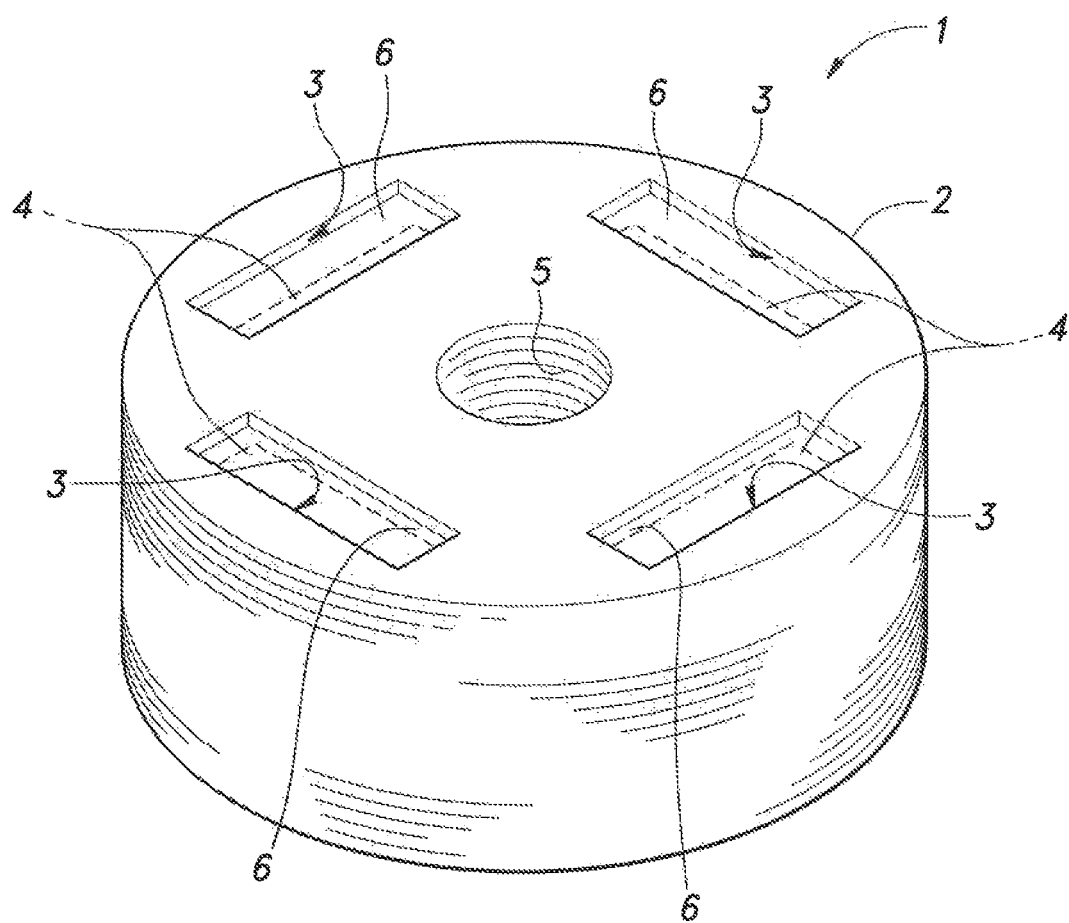
FIG. 1 is a perspective view of a magnet embedded rotor manufactured by a manufacturing method according to an embodiment of the present invention.
Figure 2:
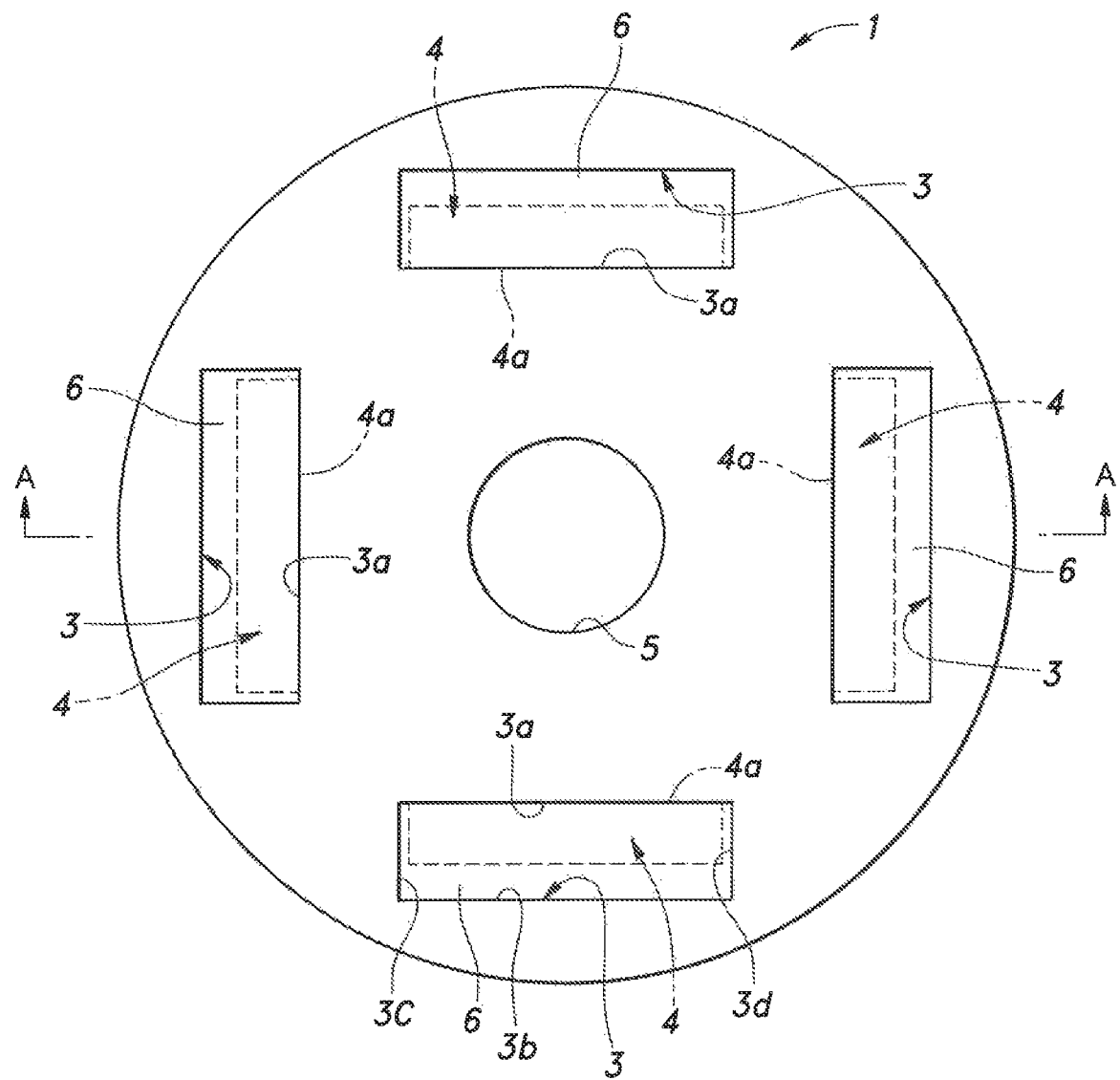
FIG. 2 is a plan view of the magnet embedded rotor shown in FIG. 1.

FIGS. 1 and 2 are a perspective view and a plan view, respectively, of a magnet embedded rotor 1 manufactured by a manufacturing method according to an embodiment of the present invention.

As shown in FIG. 1, the magnet embedded rotor (magnet embedded core) 1 is a component of an electric motor or the like, and includes a rotor core (motor core) 2 formed of a laminated iron core, and a plurality of magnets 4 received in corresponding magnet insertion holes 3 formed in the rotor core 2. The laminated iron core constituting the rotor core 2 is provided with a laminated structure in which a plurality of electromagnetic steel sheets are laminated one over another, and joined to one another by a known joining method (crimping, laser welding, etc.). The rotor core 2 has a substantially annular shape in plan view, and a shaft hole 5 opening at the center thereof fixedly receives a shaft (not shown) extending in the axial direction.

The magnet insertion holes 3 are identical in shape, and extend along the axial direction of the rotor core 2. Each magnet insertion hole 3 has a substantially rectangular shape in plan view. Although the magnet insertion holes 3 are arranged in four positions at a regular interval in the circumferential direction of the rotor core 2 in the present embodiment, the present invention is not limited to this, and the shape, the number, and the arrangement of the magnet insertion holes 3 may vary. In the present embodiment, the magnet insertion holes 3 are passed through the rotor core 2, but the present invention is not limited to this, and the magnet insertion holes 3 may be configured as bottomed holes by using an iron core laminate without openings for forming the magnet insertion holes 3 in the iron core laminates (for example, as the lowermost iron core laminate) constituting the rotor core 2 (laminated iron core).

Each magnet 4 has a substantially rectangular parallelepiped shape, and is fixed in position by resin 6 filled into the magnet insertion hole 3 while the magnet 4 is placed in the magnet insertion hole 3. The resin 6 consists of a cured state of resin material 33 (see FIG. 4) which is described hereinafter. Each magnet 4 may consist of, for example, a ferrite-based sintered magnet or a permanent magnet (with or without magnetization) such as a neodymium magnet. The axial length of each magnet 4 is slightly smaller than the axial length of the magnet insertion hole 3, and the end face (in this case, the upper face) of the magnet 4 is covered with the resin 6. However, the axial length of the magnet 4 can be changed, and it may also be arranged such that at least a part of the end face of the magnet 4 is exposed from the opening of the magnet insertion hole 3. The resin 6 may consist of a thermosetting resin such as an epoxy resin.

The magnet 4 is inwardly offset (or offset toward the center of the rotor core 2) in the magnet insertion hole 3, and the inner surface 4a of the magnet 4 abuts against the inner surface 3a of the magnet insertion hole 3. In the drawings, for the convenience of description, the clearance between each surface defining the magnet insertion hole 3 (excluding the inner surface 3a) and the corresponding side surface of the magnet 4 (excluding the inner surface 4a) is shown greater than the practical size.

Figure 3:
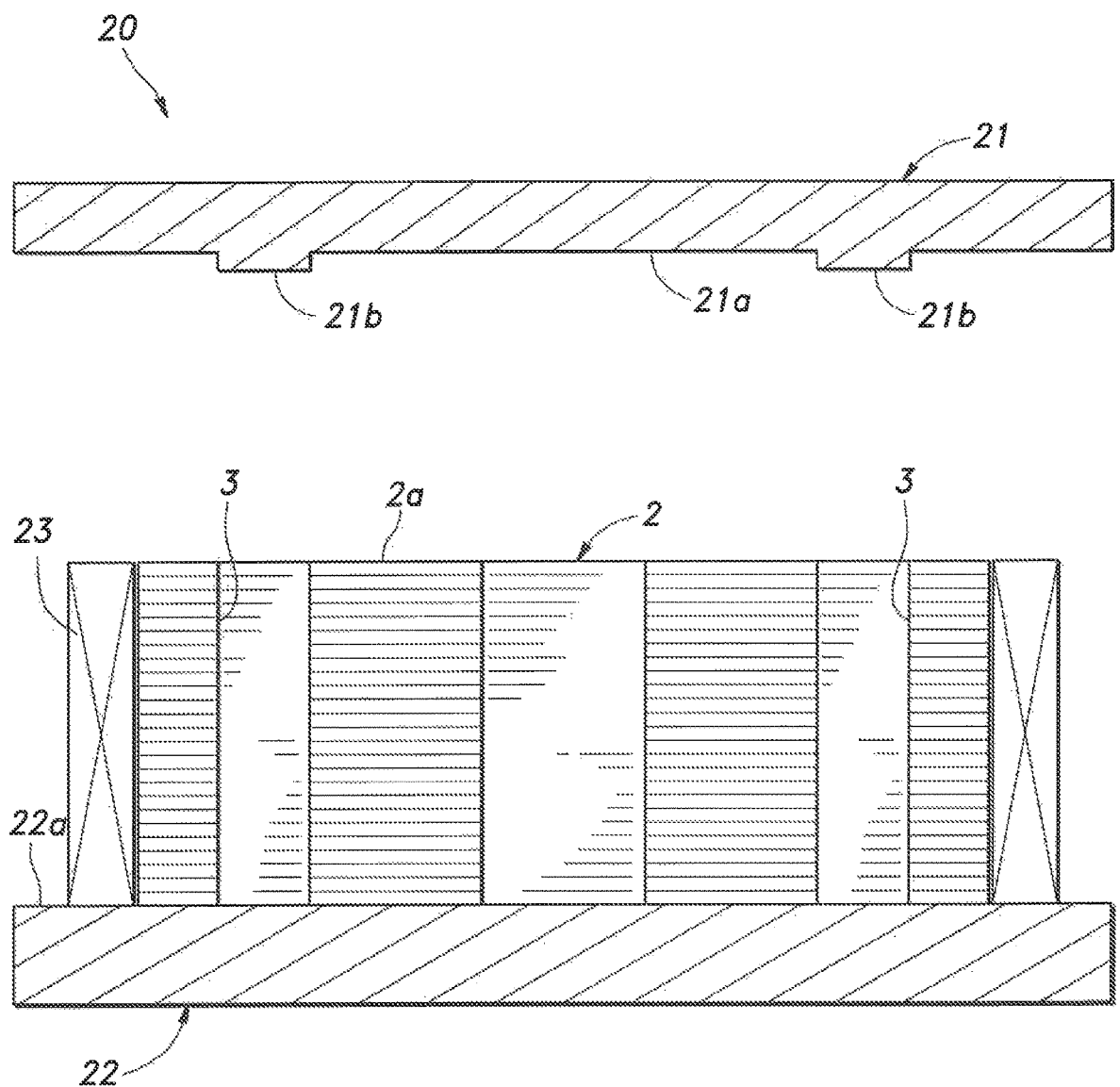
FIG. 3 is a fragmentary sectional view of a manufacturing device for the magnet embedded rotor shown in FIG. 1.

FIG. 3 is a fragmentary sectional view of a manufacturing device 20 for the magnet embedded rotor 1 according to the embodiment. In FIG. 3, the rotor core 2 is placed in the manufacturing device 20, and the rotor core 2 in FIG. 3 is shown as a cross sectional view taken along line A-A of FIG. 2.

The manufacturing device 20 consists of a resin filling device for embedding the magnets 4, which are received in the corresponding magnet insertion holes 3 provided in the rotor core 2, in the resin 6, and includes an upper die 21, a lower die 22, and a heating unit 23 for heating the rotor core 2 as required.

On a lower side of the upper die 21, a lower surface 21a that abuts an upper surface 2a of the rotor core 2 in a later-described pressurization step is formed. On the lower side of the upper die 21, projections 21b protrude from the lower surface 21a, and have a shape (substantially rectangular parallelepiped shape) to be received in the upper portions of the corresponding magnet insertion holes 3. On an upper side of the lower die 22, an upper surface 22a on which the rotor core 2 is placed is formed. By placing the rotor core 2 on the lower die 22, the lower openings of the magnet insertion holes 3 are closed by the upper surface 22a of the lower die 22.

In the illustrated embodiment, the upper die 21 is moveable while the lower die 22 is fixed. In particular, the upper die 21 is vertically movable by a lifting unit (not shown), and is capable of pressurizing the rotor core 2 interposed between the upper die 21 and the lower die 22. However, the relationship between the fixed side and the movable side of the upper die 21 and the lower die 22 can be changed when so desired.

The heating unit 23 surrounds the rotor core 2 placed on the lower die 22, and may consist of a high frequency electromagnetic induction heating unit provided with a heating coil for heating the rotor core 2 by electromagnetic induction although the details thereof are omitted here. The heating unit 23 is not limited to this type of heating unit, but may consist of any other type of heating unit which can raise the temperature of the rotor core 2 to a desired temperature.

Figure 4:
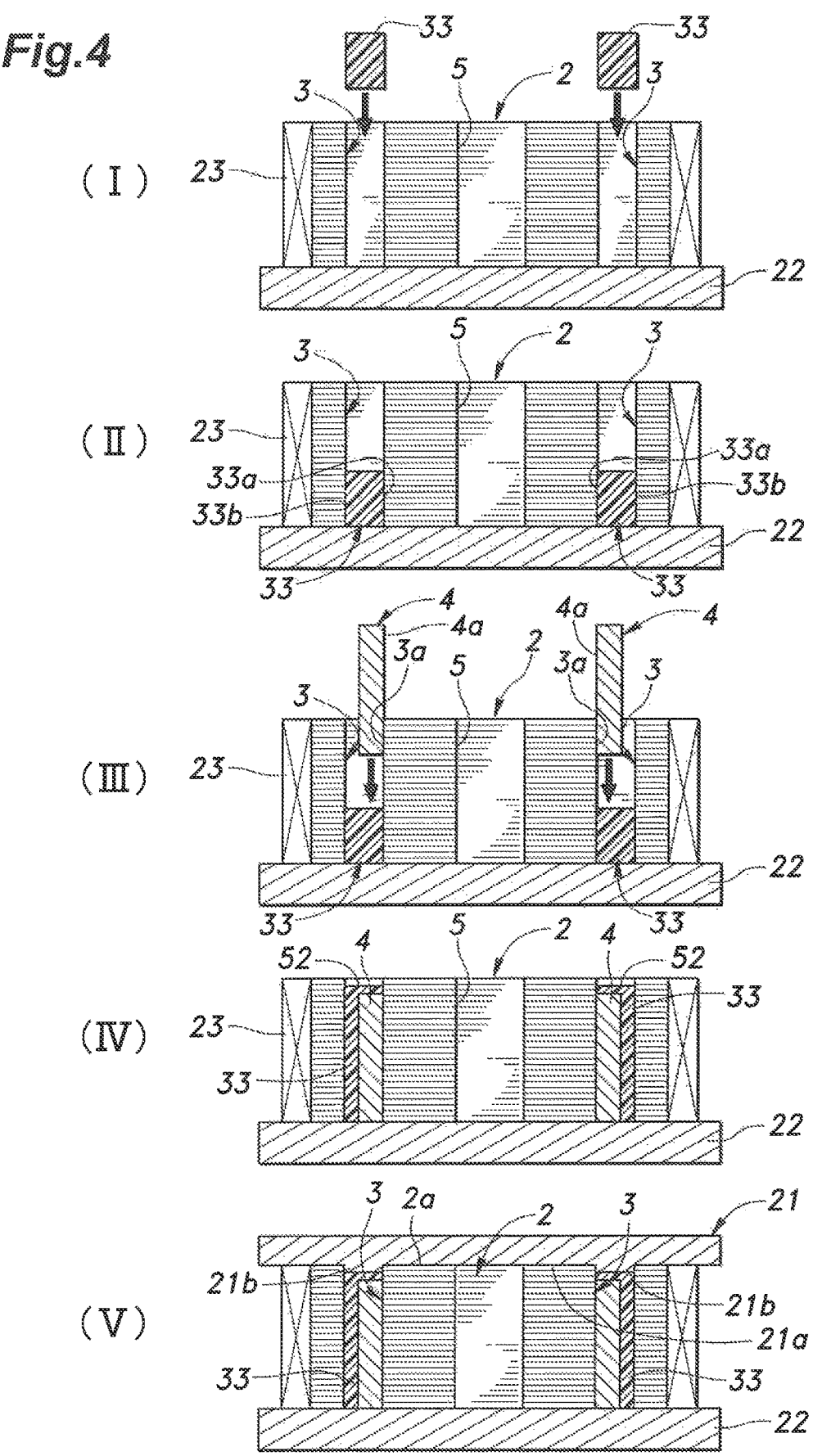
FIG. 4 is an explanatory view showing the main steps in the process of manufacturing the magnet embedded rotor by using the manufacturing device shown in FIG. 3.
Figure 5:
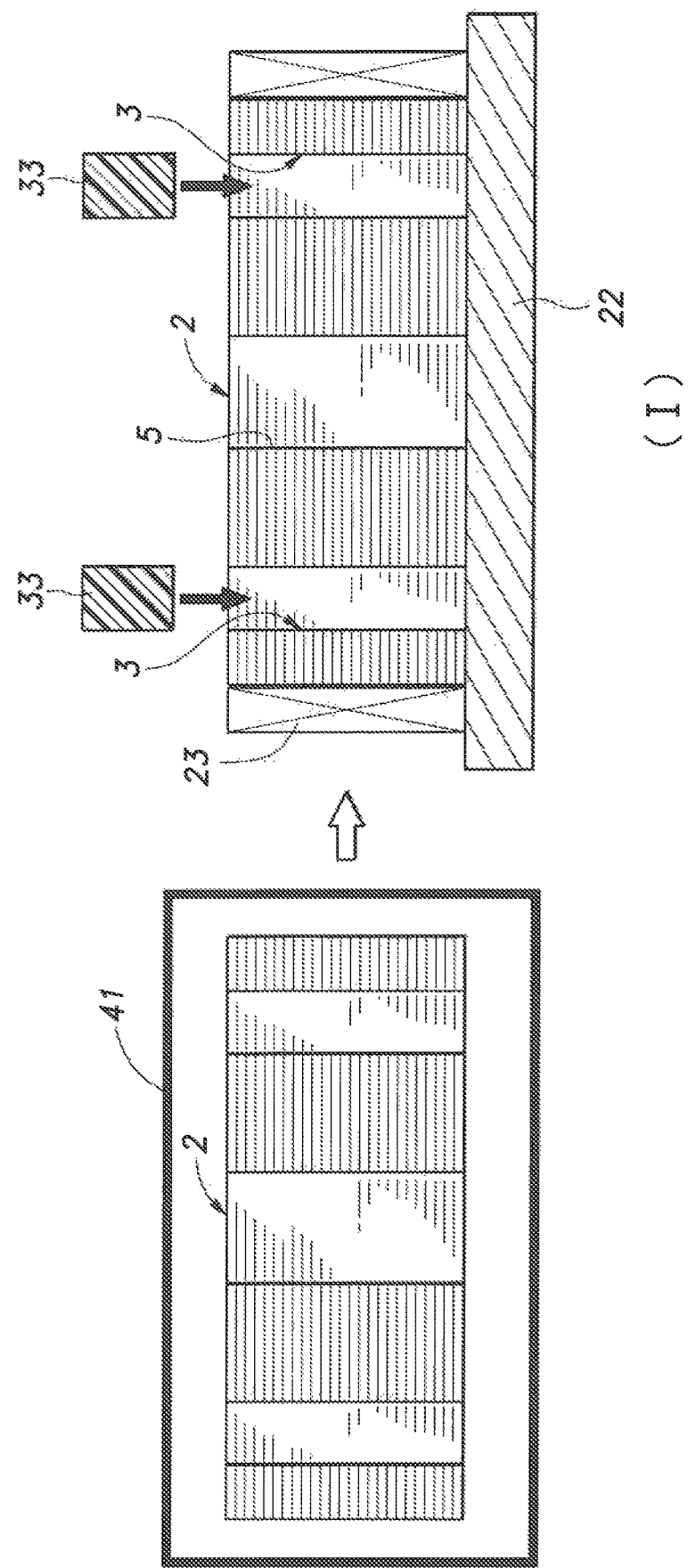
FIG. 5 is an explanatory view showing a preheating step for a rotor core.
Figure 6:
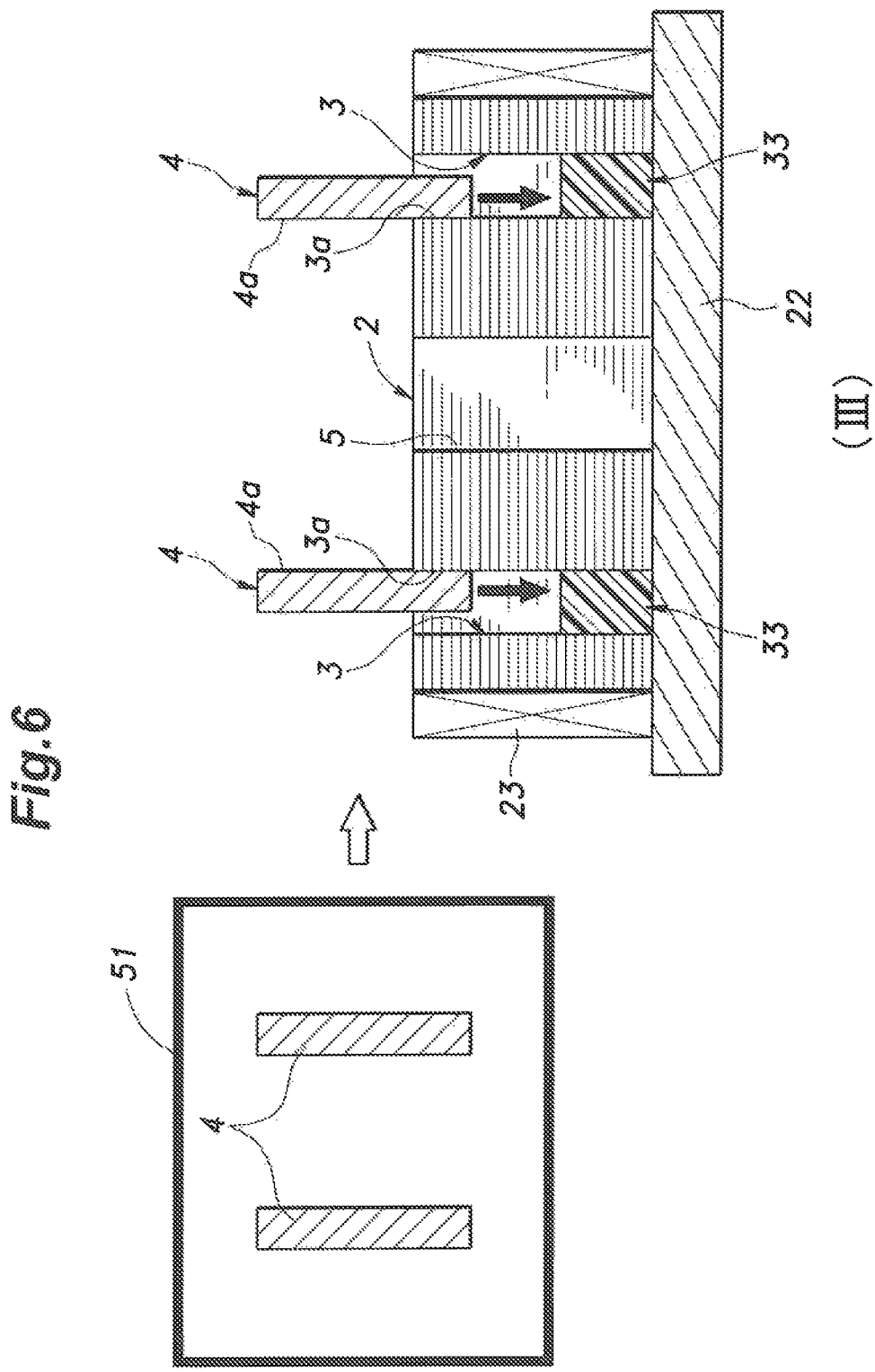
FIG. 6 is an explanatory view showing a preheating step for magnets.
Figure 7:
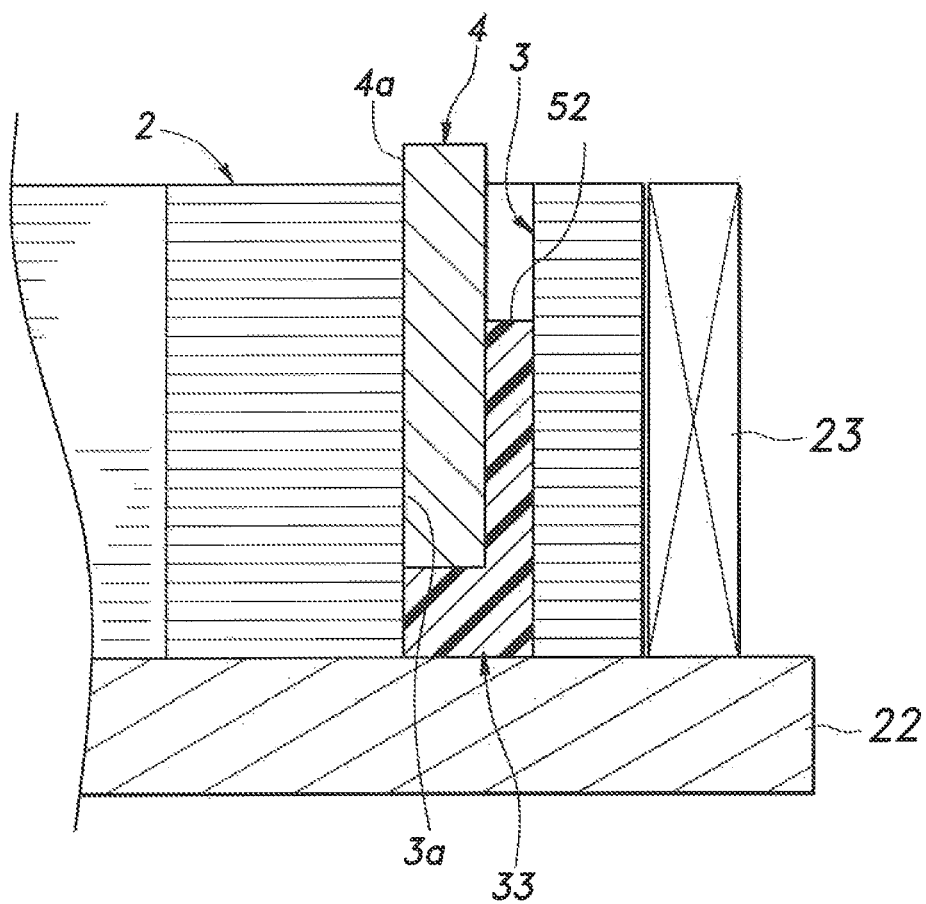
FIG. 7 is an explanatory view showing an intermediate step of the magnet insertion step (III), (IV) shown in FIG. 4.

FIG. 4 is an explanatory view showing the main steps in the manufacturing process (resin filling) of the magnet embedded rotor 1 by using the manufacturing device 20 shown in FIG. 3. FIG. 5 is an explanatory view showing a preheating step for the rotor core 2 (core preheating step). FIG. 6 is an explanatory view showing a preheating step for the magnets 4 (magnet preheating step). FIG. 7 is an explanatory view showing an intermediate step of the magnet insertion step (III), (IV) shown in FIG. 4.

In the manufacturing process for the magnet embedded rotor 1, first of all, as shown in (I) and (II) of FIG. 4, after the rotor core 2 is placed on the lower die 22, a resin charging step consisting of inserting the resin material 33 in solid form into each magnet insertion hole 3 is performed. The resin material 33 in solid form as used herein is not necessarily required to be in solid form in literal sense as long as the resin material is capable of retaining a certain shape when being inserted into the magnet insertion holes 3 (or in a substantially non-fluid state).

In the illustrated embodiment, the resin material 33 is formed by processing granular raw material resin (or by molding the granular raw material resin by using a compacting press machine not shown in the drawings) as a preliminary processing step. This preliminary processing step is performed at a lower temperature than the temperature of the resin material 33 in a melting step which will be described hereinafter. The raw material resin includes those in the form of powder, tablets or the like having any shape such as beads, flakes or columnar pieces in a size that can be poured into the openings of the magnet insertion holes 3. Thereby, it is possible to prevent the resin material 33 in the granular form (namely, having relatively small diameters) from being scattered out of the magnet insertion holes 3 during the resin charging step and a later-described melting step and to prevent voids from being formed in the resin material filling the magnet insertion holes 3.

The molded resin material 33 has a substantially rectangular parallelepiped shape conforming to the shape of the magnet insertion hole 3, and the four side surfaces (only the inner side surface 33a and the outer side surface 33b are shown in (II) of FIG. 4) of the molded resin material 33 abut or are in close proximity of the corresponding inner surface 3a, outer surface 3b, left surface 3c and right surface 3d (see also FIG. 2), respectively, of the corresponding magnet insertion hole 3 when the molded resin material. 33 is fully inserted in the magnet insertion hole 3 as shown in (II) of FIG. 4.

It is sufficient if at least one of the four side surfaces of the resin material 33 is brought into contact with the corresponding surface of the magnet insertion hole 3 when the molded resin material 33 is fully inserted in the magnet insertion hole 3. However, if all of the four side surfaces of the resin material 33 are in contact with the corresponding surfaces of the magnet insertion hole 3, heat transfer from the rotor core 2 (in particular, the surfaces defining the magnet insertion hole 3) to the resin material 33 placed in the magnet insertion hole 3 is promoted so that the resin material 33 in the magnet insertion hole 3 can be processed more quickly in the melting step and the thermally curing step which will be described hereinafter.

In addition, the amount (volume) of the resin material 33 that is to be charged into the magnet insertion hole 3 should be selected such that the molten resin material 33 does not overflow from the upper opening of the magnet insertion hole 3 (or overflows only slightly) when the magnet 4 is inserted into the magnet insertion hole 3 in the magnet insertion step which will be described hereinafter.

In manufacturing the magnet embedded rotor 1, a core preheating step consisting of preheating the rotor core 2 to a predetermined temperature in a heating oven 41 may be performed prior to the resin charging step as shown in FIG. 5. Thereby, as will be discussed hereinafter, even when the heat provided by the preheating of the magnet 4 is not adequate for sufficiently inciting the resin material 33, the resin material 33 in the magnet insertion hole 3 can be melted to a sufficient extent in a reliable manner. The core preheating step does not necessarily require the use of the heating oven 41, but may also be performed by using any other heating apparatus as long as it can heat at least the rotor core 2 to a desired temperature. If desired, the core preheating step may be performed by using the heating unit 23 before performing the resin charging step.

Then, as shown in (III) and (IV) of FIG. 4, a magnet insertion step consisting of inserting the magnet 4 into each magnet insertion hole 3 which already contains the resin material 33 is performed. In this conjunction, as shown in FIG. 6, a magnet preheating step consisting of preheating the magnet 4 to a predetermined temperature in a heating oven 51 may be performed prior to the magnet insertion step.

The heat stored in the magnet 4 during the magnet preheating step contributes to the melting of (at least part of) the resin material 33 that comes in contact with the magnet 4 in the magnet insertion hole 3. In this regard, the magnet insertion step may be considered as constituting a part of the melting step of melting the resin material 33. In the melting step, it is necessary to control the heating of the resin material 33 so that the resin material 33 reaches at least a temperature at which the resin material 33 can be melted (become fluidic). Further, in this melting step, the heat stored in the rotor core 2 preheated by the above described core preheating step can also be utilized. It is preferable that the temperature of the magnet 4 preheated by the magnet insertion step and the temperature of the rotor core 2 preheated by the core preheating step are controlled to be a substantially same temperature.

Further, if the amount of heat supplied by the magnet 4 and the rotor core 2 that are preheated (at least one of them) is insufficient for melting the resin material 33, a melting step may be executed for melting the resin material 33 by using the heating unit 23 at least as a part of the magnet insertion step shown in (III) and (IV) of FIG. 4. In this case, in addition to or instead of the melting step performed by using the heating unit 23 in the step of (III) and (VI) of FIG.

4, a similar melting step may be executed as a part of the resin charging step shown in (I) and (II) of FIG. 4.

In the magnet insertion step, the liquid surface 52 of the resin material 33 melted in the magnet insertion hole 3 gradually rises as the magnet 4 is inserted deeper into the magnet insertion hole 3 as shown in FIG. 7. The liquid surface 52 eventually reaches the vicinity of the upper surface 2a of the rotor core 2 as shown in (IV) of FIG. 4 (or, in other words, the filling of the resin material 33 into the magnet insertion hole 3 is completed).

In this case, preferably, the magnet 4 is inserted into the magnet insertion hole 3 while the inner surface 4a of the magnet 4 is kept in contact (sliding contact) with the inner surface 3a of the magnet insertion hole 3 (or, in other words, the insertion of the magnet 4 is guided by the inner surface 3a).

Thereafter, as shown in (V) of FIG. 4, by lowering the upper die 21, the rotor core 2 is clamped (with a predetermined force) in a pressurized state between the upper die 21 and the lower die 22 in a pressurization step (compression molding step). At this time, each projection 21b of the upper die 21 is fitted into the corresponding magnet insertion hole 3 so that the interior of the magnet insertion hole 3 is pressurized. At least one of the upper die 21 and the lower die 22 may be provided with a vent hole (for example, a groove communicating the magnet insertion hole 3 with the outside) for conducting the air trapped in the magnet insertion hole 3 to the outside.

Further, in the state shown in (V) of FIG. 4, for the purpose of thermally curing the resin material 33 pressurized in the pressurization step, the rotor core 2 is heated in a thermally curing step. At this time, a chemical reaction (crosslinking reaction) progresses owing to the heating of the resin material 33. The temperature of the resin material 33 during the thermally curing step is controlled so as to be equal to or lower than a predetermined temperature upper limit value, and the heating state is maintained for a predetermined time period.

Figure 8:
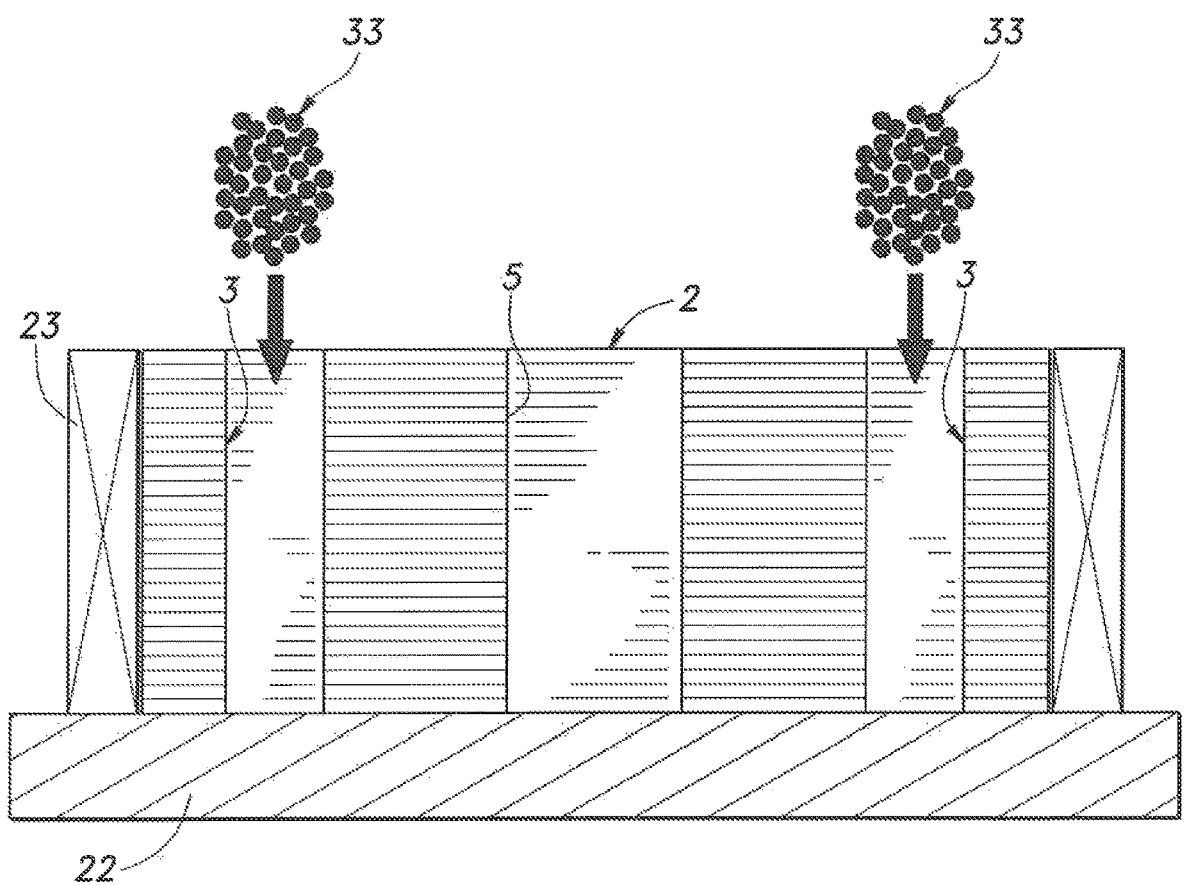
FIG. 8 is an explanatory view showing a modification of a resin charging step (I) shown in FIG. 4.

FIG. 8 is an explanatory view showing a modification of the resin charging step shown in (I) of FIG. 4. The resin material 33 was molded from raw material resin in granular form in the foregoing embodiment, but the raw material resin in granular form as it is may also be used as the resin material 33 in the resin charging step (I) as shown in FIG. 8.

Thereby, the resin material 33 can be charged into the magnet insertion hole 3 with ease regardless of the shape of the magnet insertion hole 3 or the required amount of the resin material 33. It should be noted that the shape of the resin material 33 is not limited to a granular shape, but may also be in other shapes (for example, in a sheet shape).

Although the present invention has been described in terms of specific embodiments thereof, these embodiments are merely examples, and the present invention is not limited by these embodiments. For example, the resin material 33 consisted of thermosetting resin in the above embodiment, but may also consist of thermoplastic resin. When thermoplastic resin is used, a solidification step by cooling is performed, instead of the thermally curing step for the thermosetting resin. In the above described embodiment, each magnet 4 was offset in the inward direction in the corresponding magnet insertion hole 3. However, the present invention is not limited to this, but the position of the magnet 4 in the magnet insertion hole 3 can be appropriately changed. For example, the magnet 4 may be disposed at the center of the magnet insertion hole 3 in plan view. The constituent elements of the method of manufacturing the magnet embedded core exemplified in the foregoing embodiments are not entirely essential for the present invention, but may be suitably omitted or substituted without departing from the scope of the present invention.

Glossary of Terms

| 1 | magnet embedded rotor (magnet embedded core) | | |
|---|---|---|---|
| 2 | rotor core (motor core) | 2a | top surface |
| 3 | magnet insertion hole | 3a | inner surface |
| 3b | outer surface | 3c | left surface |
| 3d | right surface | 4 | magnet |
| 4a | inner surface | 5 | shaft hole |
| 6 | resin | 20 | manufacturing device |
| 21 | upper die | 21a | lower surface |
| 21b | projection | 22 | lower die |
| 22a | upper surface | 23 | heating unit |
| 33 | resin material | 33a | inner surface (contact surface) |
| 33b | outer surface (contact surface) | 41 | heating oven |
| 51 | heating oven | 52 | liquid surface |

The invention claimed is:

1. A method of manufacturing a magnet embedded core including a magnet embedded in resin filling a magnet insertion hole extending axially in a motor core, the method comprising:
   a resin charging step of charging resin material in solid form into the magnet insertion hole;
   a melting step of melting the resin material in the magnet insertion hole; and a pressurization step of pressurizing an interior of the magnet insertion hole,
   wherein the melting step includes melting the resin material at least partly by preheating and inserting the magnet into the magnet insertion hole.

2. The method of manufacturing a magnet embedded core according to claim 1, wherein the resin material consists of thermosetting resin, and the method further comprises a thermally curing step of curing the resin material pressurized in the pressurization step by heating the motor core.

3. The method of manufacturing a magnet embedded core according to claim 2, wherein the method further comprises a core preheating step of preheating the motor core prior to the resin charging step.

4. The method of manufacturing a magnet embedded core according to claim 2, wherein the melting step comprises melting the resin material by heating the motor core following at least the resin charging step.

5. The method of manufacturing a magnet embedded core according to claim 2, wherein the resin material is formed by molding granular raw material resin.

6. The method of manufacturing a magnet embedded core according to claim 5, wherein the resin material is provided with a contact surface capable of contacting at least one of surfaces defining the magnet insertion hole.

7. The method of manufacturing a magnet embedded core according to claim 2, wherein the resin material is in granular form.

8. The method of manufacturing a magnet embedded core according to claim 1, wherein the method further comprises a core preheating step of preheating the motor core prior to the resin charging step.

9. The method of manufacturing a magnet embedded core according to claim 8, wherein the melting step comprises melting the resin material by heating the motor core following at least the resin charging step.

10. The method of manufacturing a magnet embedded core according to claim 8, wherein the resin material is formed by molding granular raw material resin.

11. The method of manufacturing a magnet embedded core according to claim 10, wherein the resin material is provided with a contact surface capable of contacting at least one of surfaces defining the magnet insertion hole.

12. The method of manufacturing a magnet embedded core according to claim 8, wherein the resin material is in granular form.

13. The method of manufacturing a magnet embedded core according to claim 1, wherein the melting step comprises melting the resin material by heating the motor core following at least the resin charging step.

14. The method of manufacturing a magnet embedded core according to claim 13, wherein the resin material is formed by molding granular raw material resin.

15. The method of manufacturing a magnet embedded core according to claim 14, wherein the resin material is provided with a contact surface capable of contacting at least one of surfaces defining the magnet insertion hole.

16. The method of manufacturing a magnet embedded core according to claim 1, wherein the resin material is formed by molding granular raw material resin.

17. The method of manufacturing a magnet embedded core according to claim 16, wherein the resin material is provided with a contact surface capable of contacting at least one of surfaces defining the magnet insertion hole.

18. The method of manufacturing a magnet embedded core according to claim 1, wherein the resin material is in granular form.

* * * * *